United States Patent
Yoshio

(10) Patent No.: US 9,497,060 B2
(45) Date of Patent: *Nov. 15, 2016

(54) METHOD AND CIRCUIT FOR TRANSMITTING DATA

(71) Applicant: Texas Instruments Incorporated, Dallas, TX (US)

(72) Inventor: Katsura Yoshio, Osaka (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,972

(22) Filed: Sep. 15, 2015

(65) Prior Publication Data

US 2016/0072653 A1    Mar. 10, 2016

Related U.S. Application Data

(63) Continuation of application No. 13/661,387, filed on Oct. 26, 2012, now Pat. No. 9,137,061.

(60) Provisional application No. 61/552,819, filed on Oct. 28, 2011.

(51) Int. Cl.
| H04B 3/46 | (2015.01) |
| H04L 27/26 | (2006.01) |
| H04L 25/49 | (2006.01) |
| H04B 17/10 | (2015.01) |

(52) U.S. Cl.
CPC .......... *H04L 27/2627* (2013.01); *H04B 17/10* (2015.01); *H04L 25/4902* (2013.01)

(58) Field of Classification Search
None
See application file for complete search history.

(56) References Cited

U.S. PATENT DOCUMENTS

| 5,805,094 A * | 9/1998 | Roach | G06F 3/05 341/144 |
| 2008/0019714 A1* | 1/2008 | Yamamoto | G03G 15/011 399/40 |
| 2013/0043920 A1* | 2/2013 | Lee | H03L 7/0992 327/159 |

* cited by examiner

*Primary Examiner* — Adolf Dsouza
(74) *Attorney, Agent, or Firm* — William B. Kempler; Charles A. Brill; Frank D. Cimino

(57) ABSTRACT

Methods and circuits for transmitting data are disclosed. An embodiment of a method includes transmitting a predetermined number of pulses during predetermined period of time. A first predetermined number of pulses transmitted during the predetermined period of time represents a first value and a second predetermined number of pulses transmitted during the predetermined period of time represents a second value.

18 Claims, 4 Drawing Sheets

METHOD AND CIRCUIT FOR TRANSMITTING DATA

This application is a continuation of U.S. Nonprovisional patent application Ser. No. 13/661,387, filed Oct. 26, 2012 (now U.S. Pat. No. 9,137,061), which claims priority from U.S. Provisional Patent Application No. 61/552,819 of Katsura Yoshio, filed on Oct. 28, 2011, which are incorporated by reference for all that is disclosed therein.

BACKGROUND

Serial data transmission requires sending a stream of pulses on a data line. A receiver receives the pulses and decodes the pulses into data values. Clock signals and the like are needed to be transmitted with the pulses in order to synchronize the data stream for proper decoding. If one pulse is not decoded properly, the data value represented by the pulse will be incorrect. In addition, the subsequent data values will likely be decoded improperly. The incorrect decoding continues until a reset function is transmitted that synchronizes the pulses for proper decoding. In some embodiments, timing or clock signals are transmitted on a separate line, thus requiring several wires or conductors between the transmitter and receiver.

In light-emitting diode (LED) display applications, color and intensity data is required to be transmitted to LEDs or groups of LEDs. For example, if a region of a display is to be bright and white, red, green, and blue LEDs in that region need to be illuminated. As soon as the color or intensity in that region is required to be changed, new data reflecting the changes needs to be transmitted.

As LED displays get bigger, more LEDs are used and more data needs to be transmitted to the display. With the larger sizes, more wiring is also required between a host and the LEDs, which may be referred to as clients. The additional data is subject to more errors, which will cause the display to display inaccurate data. The additional wiring is subject to failure, which will prevent a client or clients from receiving data.

DETAILED DESCRIPTION

Methods and circuits for transmitting data are described herein. The methods include transmitting a predetermined number of pulses during a predetermined period of time. The number of pulses transmitted during the predetermined period of time represents the value of data being transmitted. For example, one pulse transmitted during the predetermined period of time may represent a binary zero and two pulses transmitted during the predetermined period of time may represent a binary one. Circuits are disclosed herein that decode the transmitted pulses. Initial pulses are transmitted to establish the period of time, which alleviates the need for a separate clock or timing signal to be transmitted with the data. Furthermore, it enables the data transmission to be accomplished using a single wire.

Figure 1:
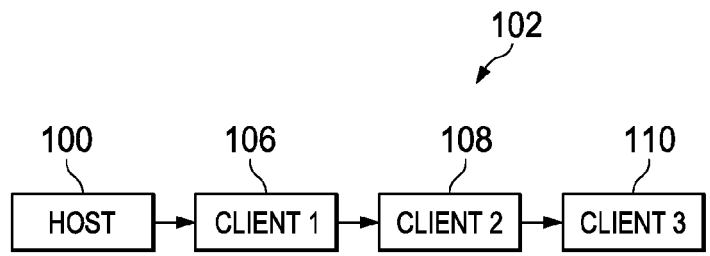
FIG. 1 is a diagram showing a host communicating with three clients.

An example of serial data transmission between a host 100 and clients 102 is shown in FIG. 1. The host 100 communicates with three clients 102 by the use of serial data transmissions. The clients 102 are referred to individually as the first client 106, the second client 108, and the third client 110. The host 100 may be a microprocessor or other device that transmits and/or receives serial data. In some embodiments, the clients 102 transmit data back to the host 100, so the host 100 may be required to also receive serial data. The serial data is transmitted from the host 100 to the first client 106. If the data is meant for the first client 106, the first client 106 processes the data; otherwise, the data is transmitted to the second client 108 where the process is repeated. The clients 102 may be any devices that receive and/or transmit serial data. In the embodiments described herein, the clients 102 are drivers for light-emitting diodes (LEDs). As described in greater detail below, each of the clients 102 may drive a plurality of LEDs.

Figure 2:
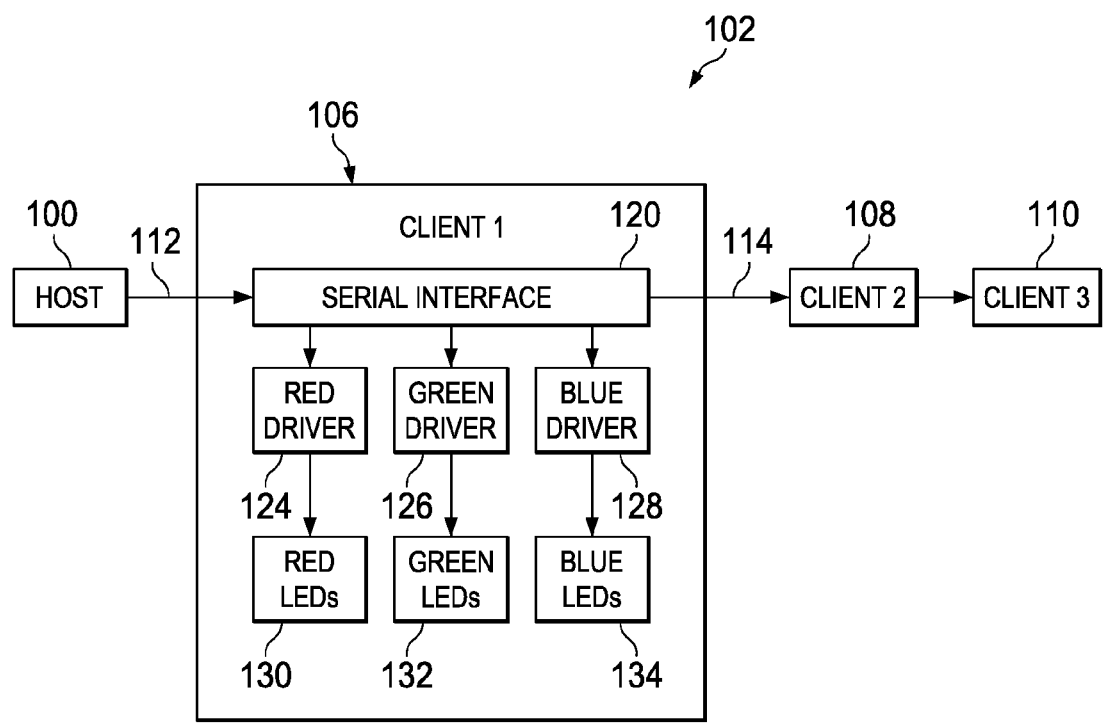
FIG. 2 is a block diagram of an embodiment of the first client of FIG. 1

A block diagram of the first client 106 is shown in FIG. 2. The first client 106 is connected to the host 100 by an input data line 112 and to the second client 108 by an output data line 114. Both the data lines 112, 114 are serial data lines. Both data lines 112, 114 are connected to a serial interface 120 that decodes or otherwise processes the data. As described in greater detail below, the serial interface 120 may perform a multitude of different functions.

The serial interface 120 ultimately sends instructions to at least one LED driver. In the embodiment of FIG. 2, three individual drivers are shown, a red driver 122, a green driver 124, and a blue driver 126. Although the drivers 122, 124, 126 are shown as individual devices, they may be a single device. The drivers are connected to LEDs that are connected together and may form strings of LEDs. In the embodiment of FIG. 2, the red driver 124 is connected to a string of red LEDs 130, the green driver 126 is connected to a string of green LEDs 132, and the blue driver 128 is connected to a string of blue LEDs 134. The drivers may cause individual LEDs in their respective strings to turn on or off per instructions from the serial interface 120 or, all the LEDs in a string may turn off and on simultaneously.

Figure 3:
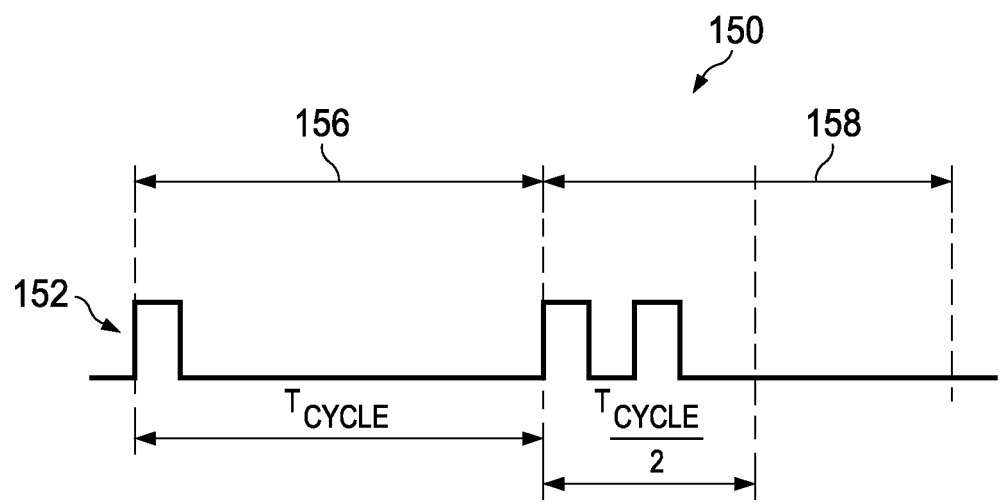
FIG. 3 is a timing diagram of an embodiment of a data transmission.

Having summarily described the data transmission, the serial data format and the operation of the host 100 and the clients 102 will now be described in greater detail. Reference is made to FIG. 3, which is a timing diagram 150 of an embodiment of the serial data format used between the host 100 and the clients 102. The data is transmitted as a series of pulses 152, wherein the number of pulses transmitted during a predetermined period of time $T_{CYCLE}$ (herein after "period $T_C$") determines the value of the data being transmitted during the period $T_C$. The timing diagram of FIG. 3 has two periods $T_C$, which are referred to individually as the first period 156 and the second period 158. In the embodiments described herein, a single pulse transmitted during a period $T_C$ is representative of a binary zero and two pulses transmitted during a period $T_C$ is representative of a binary one. Therefore, a binary zero is being transmitted during the first period 156 and a binary one is being transmitted during the second period 158.

In order to provide time for processing, the pulses 152 may have to be received in a time that is shorter than the period $T_C$. In the embodiments described herein, the pulses are received in a time that is half of the period $T_C$. This shorter period enables the clients to process the data as it is received.

The time period $T_C$ may be set by the serial data transmission. With additional reference to FIG. 4, the host 100 may transmit two initial pulses 160 to set the time period $T_C$. The pulses 160 are referred to individually as the first pulse 162 and the second pulse 164. The time between the leading edge 166 of the first pulse 162 and the leading edge 168 of the second pulse 164 establishes the time period $T_C$. It is noted that other signals, such as the trailing edges of the pulses 160 may also be used to establish the time period $T_C$. The client uses this time period $T_C$ as a reference to determine how many pulses are received in succeeding periods $T_C$. Based on the number of pulses, the serial data is readily decoded as described above.

A data sequence may be transmitted from the host 100 after the timing pulses are transmitted. Each client may have a separate data sequence transmitted to it. The data sequence may have a predetermined number of time periods $T_C$. At the end of a transmission of a predetermined number of time periods $T_C$, the next data sequence may be transmitted to another client. For example, a first data sequence may be transmitted to the first client 106. When the data sequence is complete, a second data sequence may be transmitted to the second client 108. In some embodiments, an end of sequence signal is transmitted from the host 100 to the clients 102 to indicate that the sequence has ended. The end of sequence signal is decoded by the serial interface 120, which acts accordingly. For example, the serial interface 120 may cause the data to pass to the output data line 114 so that another client may process the data. The end of sequence signal may be a plurality of time periods $T_C$ where no pulses are transmitted.

Figure 4:
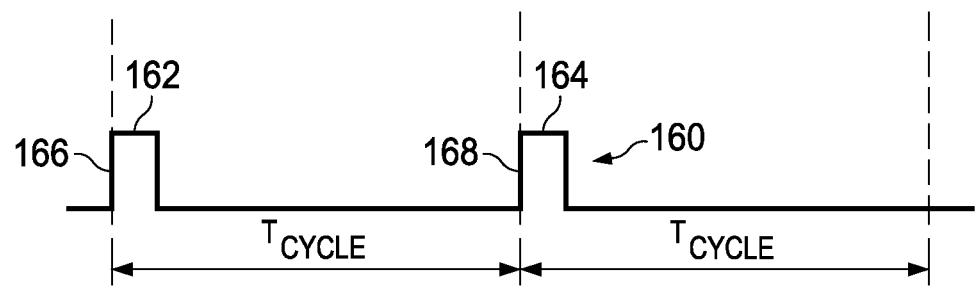
FIG. 4 is a timing diagram of an embodiment of initial data transmitted from the host of FIG. 1 to a client to establish clock timing.
Figure 5:
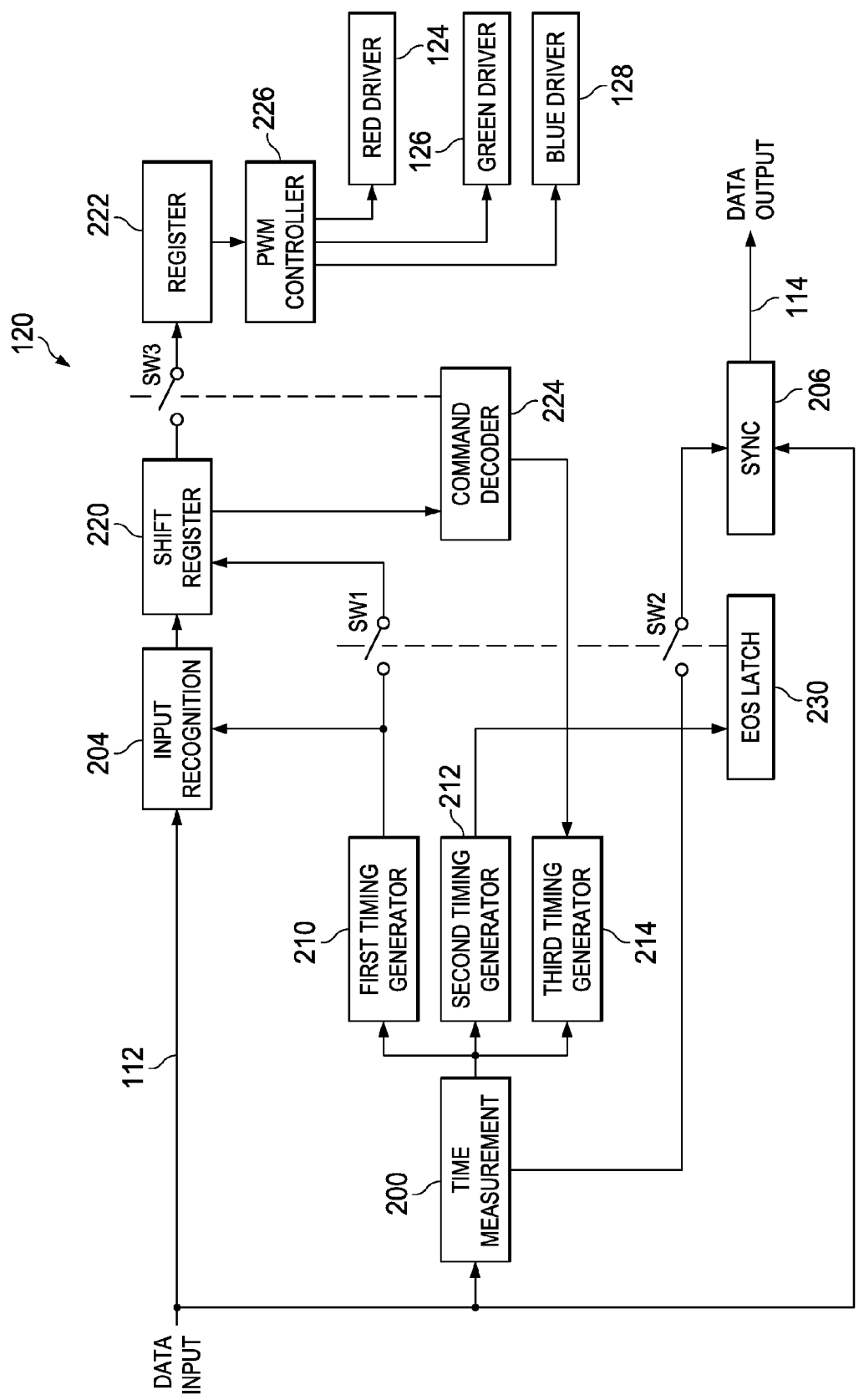
FIG. 5 is a block diagram of a serial interface of FIG. 2.

Having described the basic elements of the transmission format and the host 100 and clients 102, a more detailed version of the serial interface 120 will now be provided. A block diagram of a serial interface 120 in the first client 106 using the above-described transmission format is shown in FIG. 5. The input data line 112 is connected to a time measurement circuit 200, an input recognition circuit 204, and a synchronization circuit 206. The time measurement circuit 200 measures the time difference between the first pulse 162, FIG. 4, and the second pulse 164 to establish the period $T_C$. The input recognition circuit 204 determines whether data on the input data line 112 is timing information or data. The synchronization circuit 206 guarantees that pulses transmitted from each of the clients 102, FIG. 1, have minimum pulse widths. Otherwise, the pulse widths may reduce as the data is transmitted through the clients 102 and may eventually become unreadable. For example, an input pulse on the data input 112 may have a width of 30 nS, but the first output pulse on the data output 114 may only have a width of 27 nS. Therefore, the pulse width has decreased by 3 nS and may eventually become unreadable. The synchronization circuit 106 makes sure that the pulse widths on the output 114 have a predetermined minimum pulse width so that they may be read by subsequent clients.

The time measurement circuit 200 outputs data to three timing generators, which are referred to individually as the first timing generator 210, the second timing generator 212, and the third timing generator 214. The first timing generator 210 generates a clock signal having a period of $T_C$. The second timing generator generates or recognizes a signal having a period equal to the end of sequence signal. The third timing generator 214 generates a signal that may be used for timing so that all the LEDs illuminate together. The signals generated or recognized by the timing generators 210, 212, 214 may all be multiples of the time period $T_C$.

The first timing generator 210 is connected to the input recognition circuit 204 and to a shift register 220 by way of a switch SW1. The shift register 220 receives data that is transmitted from the input data line 112 when the switch SW1 is closed. The shift register 220 is connected to a register 222, by way of a switch SW3, and to a command decoder 224. The register 222 stores the data that is received on the input data line 112. The data may include commands, which are decoded by the command decoder 224. The commands may include timing as to when the data in the shift register 220 is to be transferred to the register 222. The switch SW3, which is controlled by the command decoder 224, may control when data is transferred from the shift register 220 to the register 222. The register 222 outputs data to a pulse width modulation (PWM) controller 226 that converts the data to pulse width modulation signals. The pulse width modulation signals control the LED drivers 124, 126, 128.

The second timing generator 212 is connected to an end of sequence (EOS) latch 230. The EOS latch 230 activates switches SW1 and SW2 when the end of the data sequence is reached. The switch SW1 enables the shift register 220 to receive data transmitted on the input data line 112. The switch SW2 enables the data received on the input data line 112 to be transmitted to the output data line 114.

The components of the serial interface 112 and their interaction with each other will now be described in greater detail. Data transmitted from the host 100, FIG. 1, is received on the data input line 112. The first data signals transmitted are the first and second pulses 162, 164, FIG. 4. The time measurement circuit 200 recognizes the first and second pulses 162, 164 and generates the time period $T_C$ based on the time difference between the pulses 162, 164. The data generated by the time measurement circuit 200 is transmitted to the three timing generators 210, 212, 214.

The first timing generator 210 generates a clock signal having a period of $T_C$. The second timing generator 212 generates or calculates a time corresponding to the EOS. For example, the EOS may be a period of three times the period $T_C$. The second timing generator 212 may monitor the input data line 112 for a period of the EOS when no data is transmitted. This period may be indicative of the EOS. The third timing generator 214 generates a signal that is as long as command data that may be transmitted with the data controlling the LEDs. For example, the command data may be twelve bits and is therefore twelve times the length of the period $T_C$. This period is used to separate command instructions from data as described below.

The data on the data input line 112 is also transmitted to the input recognition circuit 204 where a determination is made as to whether the data is timing data or data used to control the LEDs. If the data is used to control the LEDs, it is decoded and then transmitted to the shift register 220. In the embodiments described herein, a single pulse in the time period $T_C$ is decoded as a binary zero and more than one pulse in the time period $T_C$ is decoded as a binary one. Other data formats may be used. For example, one pulse in the time period $T_C$ may be representative of a binary zero and more than one pulse in the time period $T_C$ may be representative of a binary one.

If the data received on the data input line 112 is intended for the first client 106, then switch SW2 is open so that the data is not output to the second client 108. The switch SW1 is closed, so the clock signal generated by the first timing generator 210 clocks the data into the shift register 220. A portion of the data may contain the command. For example, the first twelve bits may be command data, which may be transmitted to the command decoder 224. In order to process the command data, the third timing generator 214 may also be connected to the shift register 220 to indicate when the command data starts and/or finishes.

When all of the data is transmitted, the EOS information is transmitted. The second timing generator 212 monitors the input data for the signal for the EOS. When it is received, the second timing generator 212 opens the switch SW1 and closes the switch SW2. Opening the switch SW1 prevents data meant for the other clients 102 from being loaded into the shift register 220. Closing the switch SW2 enables the data received on the data input line 112 to be output on the data output line 114.

The EOS may also cause the data stored in the shift register 220 to be transferred to the register 222. In the embodiment of FIG. 5, the third timing generator 214 generates a signal for updating the register 222. The third timing generator 214 is beneficial when all of the device register timing needs to be synchronized by separating data communications from command instructions. In some embodiments, the data is transferred to the register 222 irrespective of a command instruction. The register 222 may decode the data for specific LEDs. For example, the first twelve bits may determine the brightness of a red LED and the second twelve bits may determine the brightness of blue LEDs. This data is read by the PWM controller 226, which translates the data into PWM signals that are transmitted to the LED drivers 124, 126, 128. The LEDs are then driven in a conventional manner. Accordingly, the LEDs are driven as soon as the data is received by the client.

Figure 6:
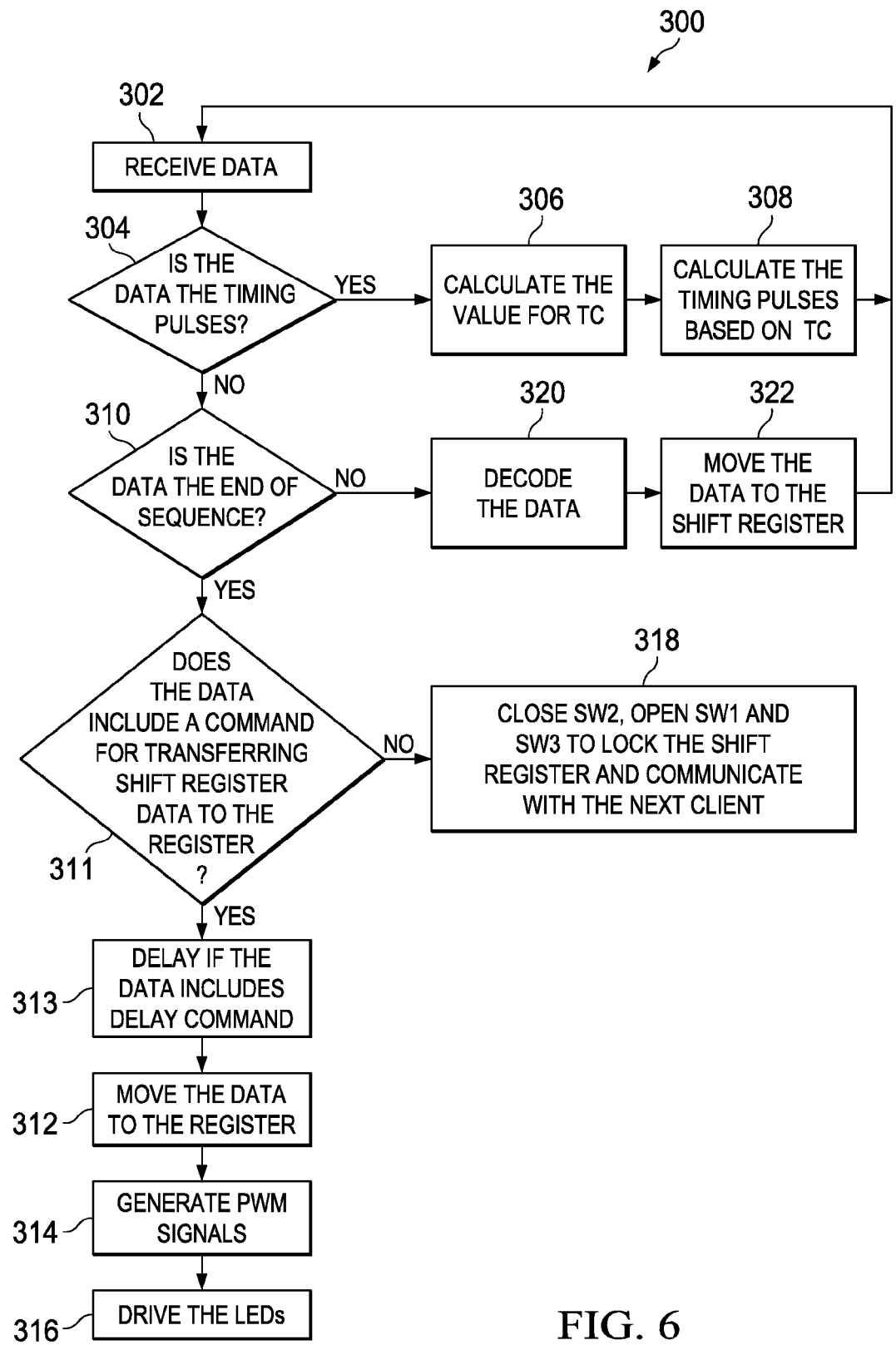
FIG. 6 is a flow chart describing the operation of the serial interface of FIG. 5 and a method for decoding data transmitted to the serial interface.

The operation of the circuit and method for decoding data will now be described with reference to the flow chart 300 of FIG. 6. At step 302, data is received by the data input line 112. Decision block 304 determines if the data is timing data as shown in FIG. 4. If the data received by the data input line 112 is timing data, processing proceeds to step 306 where the time measurement circuit 200 measures the distance between the first two pulses to determine $T_C$. Based on the value of $T_C$, the remaining timing pulses are calculated/generated by the timing generators 210, 212, 214 and as shown by step 308. Processing then returns to step 302 to receive further data.

If the determination at decision block 304 is negative, processing proceeds to decision block 310 to determine if the data is an end of sequence instruction. For example, the second timing generator 212 may determine if the data input line 112 has been at a logic low for a predetermined period of time that is indicative of the end of sequence instruction. If the end of sequence instruction has been received, processing proceeds to decision block 311 to determine if data should be transferred to the register 222 based on commands from the command decoder 224 and the third timing generator 214. If there is a command to transfer the data to the register 222 at a specific time, processing proceeds to block 313 where the data transfer is delayed so that all the clients 102 may display data simultaneously. More specifically, in some embodiments, the host 100 may transmit commands that cause all the clients 102 to simultaneously drive their respective LEDs. When an image is displayed, the simultaneous driving of the LEDs will cause the whole image to be displayed at once rather than portions of the image as the different clients 102 decode data corresponding to different portions of the image.

Following the delay of step 313, processing proceeds to step 312 where the data is moved from the shift register 220 to the register 222. Based on the data in the register 222, the PWM controller 226 generates PWM signals at step 314. The PWM signals are then output to the drivers 124, 126, 128 to drive the LEDs at step 316. If decision block 311 is negative, the data may be stored in the shift register 220 per step 318. In doing so, switches SW1 and SW 3 are open to lock the shift register. Switch SW 2 is closed to enable data to be transferred to the next client.

If decision block 310 is negative, processing proceeds to block 320 because the data received at the data input line 112 is used to control the LEDs. In step 320, the data is decoded by the input recognition circuit 204. The data is then transmitted to the shift register 220 for storage as shown at step 322. Processing then proceeds to step 302 where the next data signal is received.

The data transmission format described above transmits the timing or clock pulses on the same line as the data. Therefore, all of the clients 102 may receive data by a single wire, which reduces the complexity and cost of displays or other devices in which the clients 102 are located. An additional benefit with a single wire is that the electrical connections between the host 100 and the clients 102 is not as stringent as having several data lines that are all using the same potential. Therefore, the clients 102 may all be operating at different potentials and the data from the host 100 will not be affected by the different potentials. Additionally, no pull-up or pull-down resistors are required for the data transmission, so the data transmission is faster than conventional data transmissions.

It is noted that the data transmission format described herein allows for errors to be transmitted without causing data received by all the clients 102 to be erroneous. With regard to a display, an error will not cause the entire image to be displayed erroneously. For example, if the data has an error, only the data to the client in which it was transmitted will have the error. Upon transmission of the EOS, the timing calculation starts all over again with the next client and is not affected by the previous errors.

Programming using the data format is much easier than other formats, such as $I^2C$. The data transmission simply transmits data in the form of pulses that contain timing information and data. Unlike prior data techniques, data can be transmitted to several clients without address data being transmitted. The transmission format uses semaphore techniques in that when one client has received its data, the client enables a subsequent client to receive data. Therefore, no timing or addressing information, other than the initial two pulses, is required to be transmitted to the clients.

The time period $T_C$ has been described as being the time difference between the first pulse 162 and the second pulse 164. In some embodiments, the time period $T_C$ may be proportional to the time difference between the first pulse 162 and the second pulse 164. For example, the time period $T_C$ may be ten times longer than the time between the first pulse 162 and the second pulse 164.

With additional reference to FIG. 1, similar data transmission to those described above may be made using a semaphore mechanism. When the first timing generator 210 closes the switch SW1, data can be loaded to the shift register 220. Based on the first timing generator 210, the switch SW1 is open or closed, which controls the data being transmitted to the shift register 220.

In a similar data transmission technique, the host 100 may send data to the clients 102 using different data transmission formats or protocols. The data transmitted from the host 100 includes the EOS command, which causes the client receiving the data to pass the data to the next client. For example, the host 100 may start sending data to the clients 102. The first client 106 receives and processes the data until the host 100 transmits the EOS, at which time the first client 106 passes succeeding data to the second client 108. The second client 108 processes the data until it receives the EOS command, at which time the second client 108 passes succeeding data to the third client 110. The data may be in any format, such as pulse width modulation or other well-known data formats.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A transmitter for transmitting data, the transmitter comprising:
   means for transmitting a predetermined number of pulses during a predetermined period of time;
   wherein a predetermined number of pulses transmitted during the predetermined period of time represents a first binary value;
   wherein a number of pulses greater than the first predetermined number of pulses transmitted during the predetermined period of time represents a second binary value;
   wherein the transmitter transmits a first pulse of predetermined duration and
   a second pulse of substantially the predetermined duration; and
      wherein the predetermined period of time is proportional to the time between the first pulse and the second pulse.

2. The transmitter of claim 1, wherein the predetermined number of pulses is one.

3. The transmitter of claim 1, wherein the two pulses transmitted during the predetermined period represents the second binary value.

4. The transmitter of claim 1, wherein the first binary value is zero.

5. The transmitter of claim 1, wherein the second binary value is one.

6. The transmitter of claim 1, wherein the predetermined number of pulses is one and wherein the first binary value is zero.

7. The transmitter of claim 6, wherein two pulses are transmitted during the predetermined period of time and wherein the second binary value is one.

8. The transmitter of claim 1, wherein the transmitter further comprises:
   wherein the predetermined period of time is the time between the first pulse and the second pulse.

9. The transmitter of claim 1 and further comprising transmitting a predetermined number of pulses during a you second predetermined period that represents and end of sequence command and wherein the predetermined number of pulses transmitted during the second predetermined period is zero.

10. The transmitter of claim 9, wherein the second predetermined period is a multiple of the first predetermined period.

11. The transmitter of claim 1 wherein the means for transmitting is a host.

12. A method for decoding data, the method comprising:
    receiving data on an input data line;
    measuring time between two initial pulses of substantially the same duration to determine a cycle time;
    outputting binary values based on the number of pulses received in the cycle time;
    driving an LED, wherein the data received on the input data line determines the output in which the LED driver drives the LED, the time at which the drivers drive the LED is set by a synchronization circuit.

13. The method of claim 12, wherein an input recognition circuit outputs a binary zero if one pulse is received during a cycle time and wherein the input recognition circuit outputs a binary one if more than one pulse is received during the cycle time.

14. The method of claim 13 and further comprising storing binary values generated by the input recognition circuit in a register.

15. The method of claim 12 and further comprising determining if the end of the data transmitted by way of the input data line has been reached.

16. The method of claim 15 and further comprising transmitting data from an input data line to an output data line when the end of sequence circuit determines that the end of the data has been reached.

17. The method of claim 12 wherein the data received on the input data line determines an output in which a LED driver drives a LED.

18. The method of claim 17 wherein a synchronization circuit sets the time at which the driver drives the LED.

* * * * *